July 19, 1949.　　　　E. M. WHARFF　　　　2,476,935
INDUCTION HEATING APPARATUS
Filed June 25, 1946
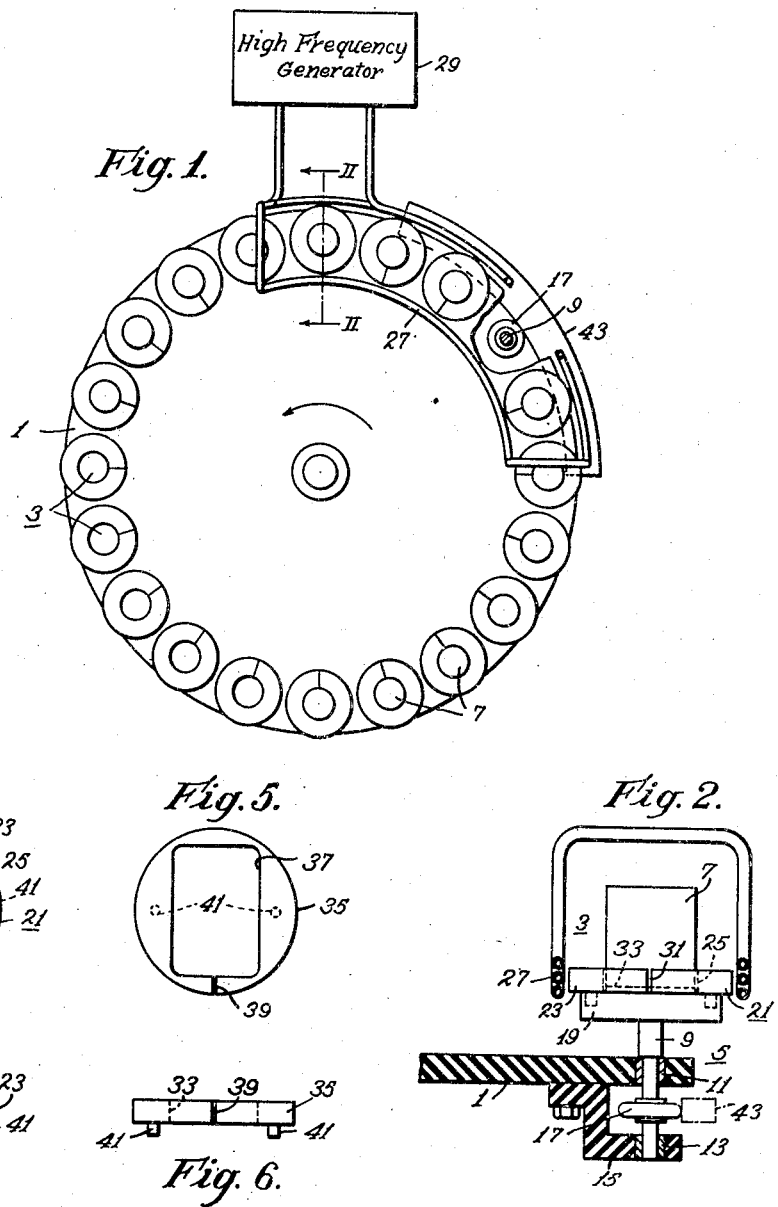
WITNESSES:
Edward Michaels
Nw. L. Groove
INVENTOR
Edward M. Wharff.
BY
B. L. Zangwill
ATTORNEY Patented July 19, 1949

2,476,935

UNITED STATES PATENT OFFICE 2,476,935

INDUCTION HEATING APPARATUS

Edward M. Wharff, Baltimore, Md., assignor to Westinghouse Electric Corporation, East Pittsburgh, Pa., a corporation of Pennsylvania Application June 25, 1946, Serial No. 679,142

2 Claims. (Cl. 219—13)

This invention relates to the induction heating of metal articles, or substances, of irregular shape which are moved by a conveyor or turn table through a rapidly alternating magnetic field. Generally, such work or charges are difficult to heat in a uniform or desired manner because the magnetic flux lines tend to pass into the article in manners determined by the conductivity, permeability and disposition of the article with respect to the field, whereas the part of the article which it is desired to heat may be unrelated to the manner in which the field lines are affected.

An object of my invention is to provide an induction heating system of a type described for controllably heating articles or pieces of work so as to concentrate the heat in desired parts of the articles, or workpieces.

A further object of my invention is to provide an induction heating system which comprises a conveyor for successively moving a plurality of articles, or workpieces, through a magnetic field, the system having means for concentrating the heat in particular parts of the articles as they move through the field.

A further object of my invention is to provide a conveyor heating system of the type described, using induction heating, in which the means which directs the heat to localized portions of the travelling articles is quickly and easily changed so that various types and kinds of articles, or workpieces, can be readily heated. These changes can be effected by an unskilled operator without difficulty.

Features, objects, and innovations of my invention, in addition to the foregoing, will be discernible from the following simplified disclosure of a preferred form to which, however, I am not limited. This disclosure, disclosing the principles of my invention, comprises the following description and drawing which are to be considered in conjunction.

In the drawing:

Figure 1 is a diagrammatic plan view, with parts broken away, of an arrangement in accordance with my invention;

Fig. 2 is a diagrammatic sectional view substantially along the line II—II of Fig. 1;

Figs. 3 and 4 are a plan view and an elevational view, respectively, of a field-affecting element used in my invention; and Figs. 5 and 6 are views, corresponding to Figs. 3 and 4, of a modified form of field-affecting element.

Referring to the drawing, the work-receiving conveyor is illustrated as a turntable 1 driven by any suitable means, either step-by-step or continuously. Preferably, the turntable is of wood, asbestos, or other insulating material. However, the table can be located far enough from the field of the coil so that it can be made of metal. The circumferential portion of the turntable is provided with a plurality of spaced heating stations 3, each comprising a work-holding means, indicated in its entirety in Fig. 2 by the reference numeral 5, for holding a workpiece 7. Each work-holding means comprises a shaft 9 rotatably supported by the turntable. To this end, a thrust and guide bearing 11 may be provided in the turntable and a guide bearing 13 under the guide bearing 11. The guide bearing 13 may be supported in a bracket 15 carried by the turntable. The portion of the shaft 9, which is between the bearings, has fixed thereto a pulley 17 which may be faced with leather, if desired. The shaft 9 has a portion, extending above the turntable, that carries a non-metallic narrow cylindrical fixture 19.

The top of the fixture 19 has a seat with a central portion shaped to receive a workpiece 7 and an outer portion providing a seat for a field-affecting means 21. The field-affecting means 21 comprises a metal plate, or disc, 23 having a central opening 25 shaped to conform to the part of the workpiece 7 which is to be controllably inductively heated.

The field-affecting means at the various heating stations are preferably of the same outer diameter and small enough to pass within but close to an arcuate elongated induction heating-coil 27 which has turned-up ends to permit the workpiece to pass longitudinally into the central part of the heating-coil, which is permeated by magnetic flux when the heating-coil is energized with high frequency current from a high-frequency tube-oscillator generator 29. The coil comprises several turns of hollow tubing through which water may be passed for cooling. The number of turns of the coil can be determined by the portions of the workpieces to be heated.

Each field-affecting means is preferably of copper which has a low resistivity or high conductivity for electricity. A cut or slot 31 is provided in each disc, which extends in a general radial direction from the periphery of the inner opening of the disc to the outer periphery of the disc. The disc acts as a secondary heating-coil or as a coupling from the long-curved heating-coil 27 to the workpieces inside the heating-coil. The magnetic flux of the heating-coil generates a high current in the disc. The slot 31 causes the current induced in the disc to flow oppositely along the sides of the slot and completely around the inner and outer peripheries of the disc but in opposite directions. This high induced current can be said to create a magnetic heating flux at the joint to be soldered or section to be heated. Thus, if, for example, the workpieces constitute electrical condenser casings or cans, to each of which a lid 33 is to be soldered, the heat is concentrated at the joint between the lid and the body of the associated can. For such purpose, the discs 23 are relatively narrow, and each located so as to surround the parts of the can that are to be soldered together.

By changing the inner contour of the disc, a differently shaped can can be treated, and in Fig. 5, I show another disc 35 having a larger inner opening 37 and a slot 39. The exterior periphery on this disc is the same as that of the disc 23.

Each of the discs, irrespective of its shape, is provided with a pair of pins 41. The pins are arranged the same way on all the discs. Each seat of the fixtures 19 has a pair of holes for receiving the pins of a disc, so that discs can be easily interchanged or different discs substituted. Consequently, workpieces of various sizes and shapes can be heat-treated in the apparatus described, without changing the induction heating-coil or controls on the high-frequency tube-oscillator generator.

It is sometimes desirable to rotate the articles being heated as they pass along the induction heating-coil. To this end, a fixed arcuate abutment 43 is provided which is engaged by the pulleys 17 as they pass through the heating-coil. The friction between each pulley and the abutment causes rotation of the work fixture, together with the workpiece and split disc which each fixture supports. By predetermining the length of the abutment 43, the workpieces will be rotated during any desired portion of its path of travel inside of the heating-coil. This is indicated in Fig. 1 by terminating the end of the abutment 43 short of the exit end of the heating-coil 27.

While I have described my invention in forms which I now consider to embrace preferred features, it is obvious that the principles of my invention can be applied to other forms and modifications.

I claim as my invention:

1. An induction heating means comprising an elongated induction heating-coil for producing a pulsating magnetic field, a conveyor means having a work-receiving station for receiving work to be carried into and out of said field, said conveyor means being constructed and arranged to move said station through said field in a predetermined direction, a removable secondary coil at said station for determining the field passing to a part of the work as the conveyor moves said work, cooperating positioning means comprising parts on said secondary coil and said station for locating and maintaining said secondary coil in predetermined magnetic coupling relation with respect to the associated work as both are moved through said field, and means for rotating said station and said secondary coil with respect to said induction heating-coil as the station and secondary coil are moved by said conveyor means through said heating-coil.

2. An elongated induction heating-coil, a conveyor means having a plurality of spaced heating stations, said heating-coil and said conveyor means being constructed and arranged so that said stations can be successively moved along the sides of said coil with a plurality of stations inside the coil, each of said stations comprising a distinct seat having a work-receiving point, each seat also having means for removably receiving a slotted and apertured metallic plate about its work-receiving point, means for rotating a seat and its plate as said conveyor means moves them through said coil, said seats and said plates having cooperative positioning means for locating a plate on its associated seat and maintaining it on said seat during movement of said conveyor means and rotation of said seats.

EDWARD M. WHARFF.

REFERENCES CITED

The following references are of record in the file of this patent:

UNITED STATES PATENTS

| Number | Name | Date |
|--------|------|------|
| 931,663 | Wilbur | Aug. 17, 1909 |
| 1,833,417 | Drake | Nov. 24, 1931 |
| 2,177,299 | Frederickson | Oct. 24, 1939 |
| 2,182,799 | Farr | Dec. 12, 1939 |
| Re. 22,322 | Goodridge | May 25, 1943 |

OTHER REFERENCES

Roberds, "Coupling Methods for Induction Heating," Electronic Industries, April 1944, pages 180, 182.